United States Patent
Sekine

Patent Number: 6,131,038
Date of Patent: Oct. 10, 2000

[54] METHOD OF AND APPARATUS FOR SELECTING A CHANNEL IN A BASE STATION BY DETERMINING THE FIELD INTENSITY OF RADIOWAVES RECEIVED

[75] Inventor: Nobuhiro Sekine, Tokyo, Japan

[73] Assignee: Oki Electric Co., Ltd., Tokyo, Japan

[21] Appl. No.: 08/958,931

[22] Filed: Oct. 28, 1997

[30] Foreign Application Priority Data

May 14, 1997 [JP] Japan ................................. 9-122732

[51] Int. Cl.⁷ .............................. H04Q 7/00; H04Q 7/20
[52] U.S. Cl. ........................ 455/513; 455/452; 455/63
[58] Field of Search .......................... 455/62, 63, 671, 455/673, 450, 454, 462, 464, 434, 515, 513

[56] References Cited

U.S. PATENT DOCUMENTS

| | | | |
|---|---|---|---|
| 5,309,503 | 5/1994 | Bruckert et al. | 455/452 |
| 5,345,597 | 9/1994 | Strawczynski | 455/62 |
| 5,418,839 | 5/1995 | Knuth et al. | 455/464 |
| 5,625,672 | 4/1997 | Yamada | 455/450 |
| 5,778,317 | 7/1998 | Kaminsky | 455/450 |

*Primary Examiner*—Paul Loomis
*Attorney, Agent, or Firm*—Venable; Robert J. Frank; Michael A. Sartori

[57] ABSTRACT

In a base station of a wireless telecommunications system for communicating with mobile terminals, a radiowave is received on a transmission channel and compared in field intensity with a threshold value. The threshold value is considered to be received while unused, in view of the receiver characteristics of the base station, and the base station selects a channel with the field intensity below the threshold value as an idle channel to form an idle channel list. To communicate with a mobile terminal, a channel is selected at random among the channels listed in the idle channel list. This makes it possible to reduce the probability that the same channel as that of a contiguous base station, will be selected and enables the channel selection to be achieved quickly and positively in the base station of the wireless telecommunications system sharing transmission channels of the same frequency band as that of contiguous base stations.

7 Claims, 3 Drawing Sheets

METHOD OF AND APPARATUS FOR SELECTING A CHANNEL IN A BASE STATION BY DETERMINING THE FIELD INTENSITY OF RADIOWAVES RECEIVED

BACKGROUND OF THE INVENTION

1. Field of the Invention

The present invention relates to a method of and apparatus for selecting a transmission channel in a private or personal wireless telecommunications system including a radio base station and a mobile terminal communicable with the former.

2. Description of the Background Art

In a conventional radio telecommunications system, a base station provided in a cell is adapted to assign to mobile stations in that cell, channels whose frequencies differ from the frequencies of channels available to base stations included in contiguous cells, thereby preventing interference between the base stations.

However, the base stations included in a private radio telecommunications system must endure the following conditions:

(1) To a base station, the same channel bands are available to the base stations contiguous thereto;

(2) It cannot be examined which radio waves are transmitted by the base stations;

(3) The information about which channels are now being used cannot be transferred between the base stations; and (4) Since the mobile stations are not adapted to continuously emit a radiowave, the failure to detect the radiowave from a mobile station, that is, the absence of the corresponding radiowave received by the base station, does not always mean that the channel is not used by another base station.

The foregoing presents a problem that it is difficult for a base station in a private wireless telecommunications system to select in the same channel band a channel different from the channels being used by the contiguous base stations to prevent interference from the latter.

In a high-rise, multiunit dwelling, in particular, a lot of private telecommunications systems may often be installed in which each apartment is provided with a private base station (mother unit) and its mobile stations (daughter units) in the horizontal and vertical spaces. Accordingly, it grows increasingly difficult to carry out quick and positive radio communications in such a space in which many base stations are present adjacent to each other.

SUMMARY OF THE INVENTION

It is, therefore, an object of the present invention to provide a method of and apparatus for selecting a transmission channel in a private wireless telecommunications system, which can quickly and positively perform the channel selection in a base station surrounded by many adjacent base stations free of the foregoing problems.

According to the present invention, in a base station of a wireless telecommunications system for communicating with a mobile terminal, a radiowave is received on a transmission channel to be compared in field intensity with a threshold value which is considered as the field intensity of a channel unused in view of the receiver characteristics of the base station, and determine a channel with the field intensity below the threshold value as an idle channel to form an idle channel list. For proceeding with communication with a mobile terminal, a channel is selected from the channels listed in the idle channel list.

In accordance with an aspect of the invention, a method of selecting a channel in a base station for communicating with a mobile terminal in a radio telecommunications system, which shares transmission channels of a frequency band common to a radio telecommunications system adjacent thereto, comprises the steps of: receiving radiowaves on the transmission channels in the radio telecommunications systems; detecting a field intensity of the radiowaves received; comparing the detected field intensity with a predetermined threshold value to determine whether or not the detected field intensity of the transmission channels is less than the predetermined threshold value; adding a transmission channel, of which the detected field intensity is determined less than the predetermined threshold value, into an idle channel list; and selecting one of the transmission channels included in the idle channel list for proceeding with establishing a connection to the mobile terminal.

In accordance with another aspect of the invention, apparatus for selecting a channel in a base station for communicating with a mobile terminal in a radio telecommunications system, which shares transmission channels of a frequency band common to a radio telecommunications system adjacent thereto comprises: a receiver for receiving radiowaves on the transmission channels in the radio telecommunications systems; a detecting circuit connected to said receiver for detecting a field intensity of the radiowaves received; control circuitry for comparing the detected field intensity with a predetermined threshold value to determine whether or not the detected field intensity of the transmission channels is less than the predetermined threshold value, adding a transmission channel, of which the detected field intensity is determined less than the predetermined threshold value, into an idle channel list, and selecting one of the transmission channels included in the idle channel list for proceeding with establishing a connection to the mobile terminal.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 3:
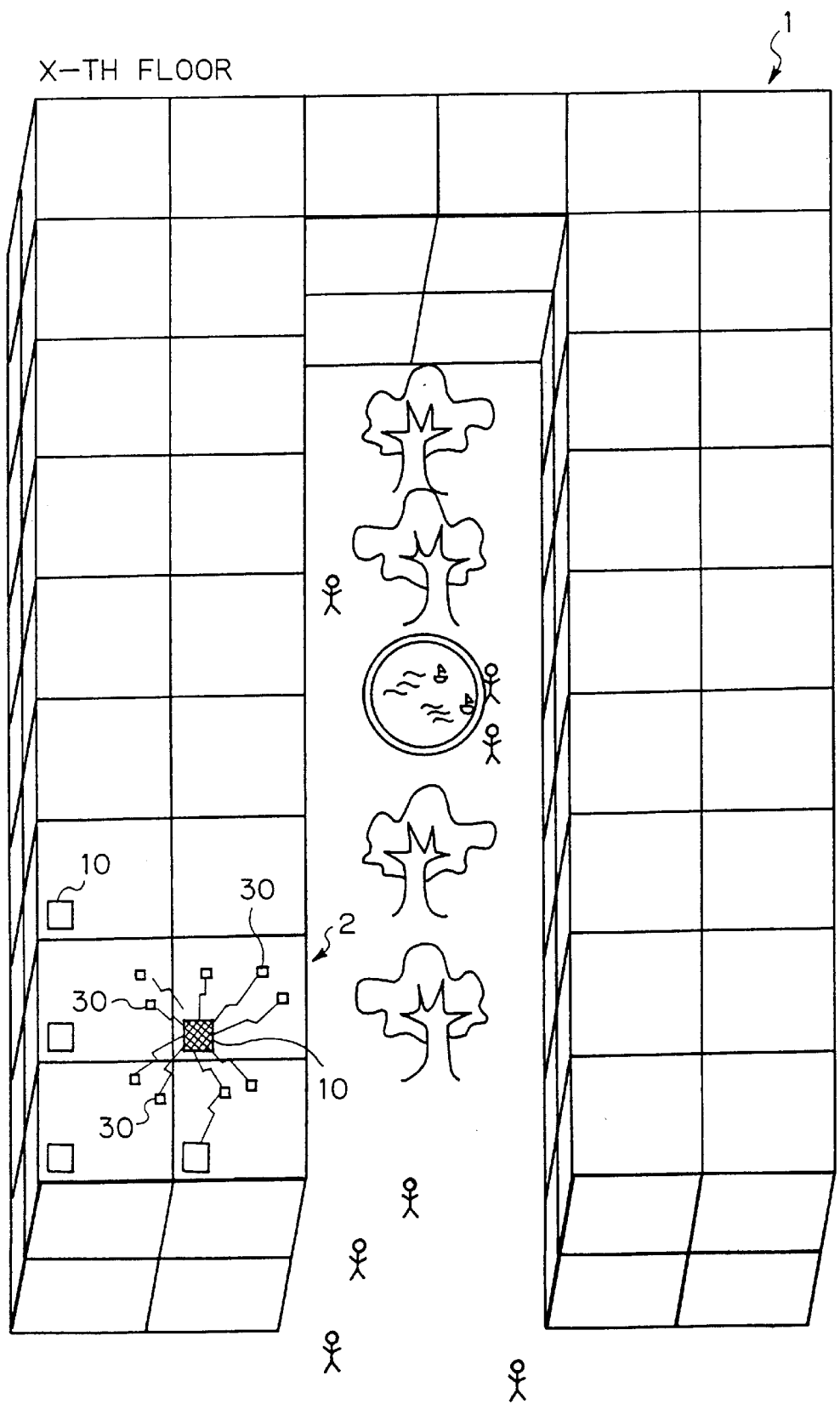
FIG. 3 shows in a perspective view an example of the disposition of base stations and mobile stations of the embodiment in an apartment building.

The invention will now be described with reference to the accompanying drawings. First, referring to FIG. 3, an exemplified disposition of base stations and mobile stations in a private wireless telecommunications system in accordance with the present invention will be described. A present-day, high-rise multiunit dwelling consists of many floors each including many houses or flats, each of which is provided with a base station (mother unit) and mobile stations (daughter units) communicable with it. In FIG. 3, showing one of the floors, X-th floor, of a high-rise apartment building 1, an apartment or house 2 on the X-th floor of the building 1 has a base station (mother unit) 10 and mobile stations or terminals (daughter units) 30 which are communicable with one another by radiowaves to establish a conversation and/or data transmission connection. Each flat may be provided with such a private wireless telecommunications system. All of those telecommunications systems in the building 1 share the transmission channels of the common frequency band.

When the base station 10 tries to communicate with one of the mobile stations 30 on a radio channel, for example, many other base stations and mobile stations of other flats may be communicating, in which case, many of the transmission channels are being in use. More specifically, since the telecommunications systems of the individual flats are distributed in the horizontal and vertical spaces in the building 1 and share the transmission channels of the frequency band common to each other, the probability increases that many of the channels are occupied when one of the base stations tries to communicate.

Figure 1:
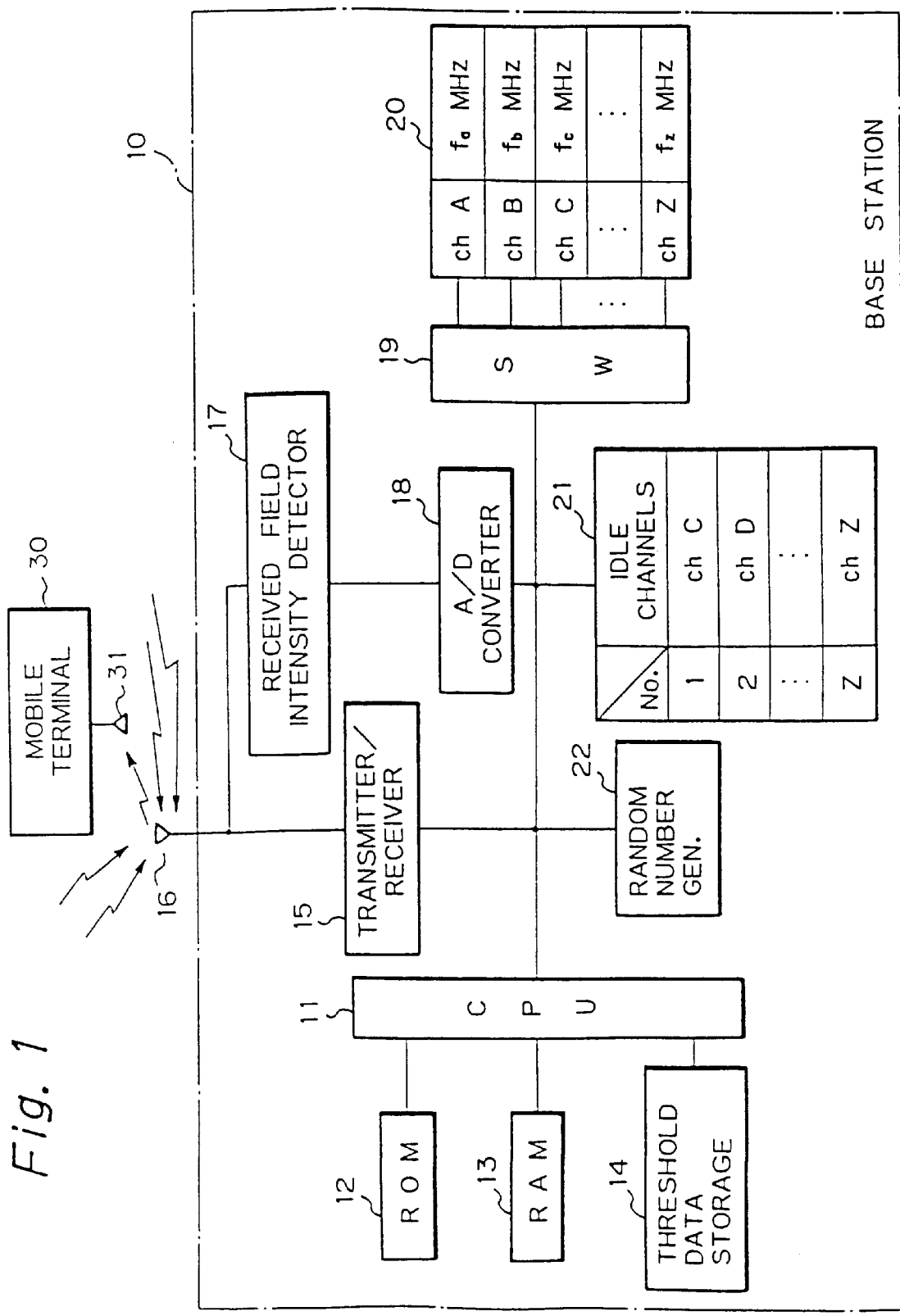
FIG. 1 is a schematic block diagram showing a preferred embodiment of channel selecting apparatus in a base station of a private wireless telecommunications system in accordance with the present invention.

The present invention facilitates a quick and positive channel selection under such circumstances. Now, referring to FIG. 1, a preferred embodiment of channel selecting apparatus for use in a private wireless telecommunications system in accordance with the invention includes a base station, generally designated with the reference numeral 10, and a mobile station or terminal 30 equipped with a transmitter/receiver antenna 31. The mobile station 30, only one of which is shown in the figure, is communicable with the base station 10 by radiowaves over transmission channels of a frequency band common to all of the private wireless telecommunications systems in the building 1.

As shown in the figure, the base station 10 includes a central processor unit (CPU) 11 adapted for controlling the entire system of the base station 10 to select an appropriate transmission channel and establish a radio connection to the mobile station 30. The base station 10 also includes a read-only memory (ROM) 12 for storing control sequences for the CPU 11 and permanent data required for the control, and a random-access memory (RAM) 13 adapted for storing temporary data and serving as a work area for the CPU 11, interconnected as shown. The control sequences include the program sequences for selecting a transmission channel, as described later, and switching a connection to the mobile stations 30.

To the CPU 11, also connected is a threshold data storage 14, which is adapted to store therein threshold data. The threshold data represents a threshold value, according to which the CPU 11 makes a decision on whether or not the field intensity of a radiowave received over a transmission channel is as weak as appropriate for establishing a connection over that channel, that is, whether or not the channel is substantially idle. For the threshold value, selected is a value corresponding to a field intensity that is considered to enable such transmission channels to be correctly selected which are determined as substantially unused channels, taking into account the receiver characteristics of the base station 10.

The CPU 11 is interconnected to a transmitter/receiver 15, which is, in turn, connected to a transmitter/receiver antenna 16, as shown in the figure. The transmitter/receiver 15 and the transmitter/receiver antenna 16, in combination with the antenna 31 of the mobile terminal 30, are adapted to establish a radiowave connection between the base station 10 and the mobile terminal 30 to transmit speech and/or data. The transmitter/receiver antenna 16 is also connected to a received field intensity detector 17, which is adapted to measure the intensity of the electromagnetic field of radiowaves captured by the antenna 16. The received field intensity detector 17 is further connected to an analog-to-digital (A/D) converter 18 for converting analog signals representing the field intensity detected by the detector 17 into corresponding digital data. The A/D converter 18 is also interconnected to the CPU 11, as illustrated.

Also connected to the CPU 11, is a channel transfer switch 19, which is further connected to a memory 20 for storing therein data representative of a table or list including all channels assignable to the base station 10. The memory 20 may be of a ROM or RAM. The channel transfer switch 19 functions by selecting one of the assignable channels in the channel list 20. In the illustrative embodiment, the channel list 20 includes assignable channels A-Z of frequencies fa-fz, respectively, which are available to the transmitter/receiver 15 and the mobile terminal 30. The base station 10 has another temporary memory 21 for storing therein data representing a table for listing idle channels of the assignable channels A-Z defined by the channel list 20.

The base station 10 also includes a random number generator 22. The random number generator 22 is connected to the CPU 11 and adapted to generate random numbers, which will be associated with the number of the idle channels included in the idle channel list 21 for selecting an appropriate one of the idle channels.

In the illustrative embodiment, the channel selecting apparatus of the base station 10 is adapted to select an appropriate channel randomly by searching or scanning all of the transmission channels defined by the channel table 20 to find out which of the channels wherein the received field intensity is received and measured as weak so that a radiowave connection on the channel thus located can be established.

Figure 2:
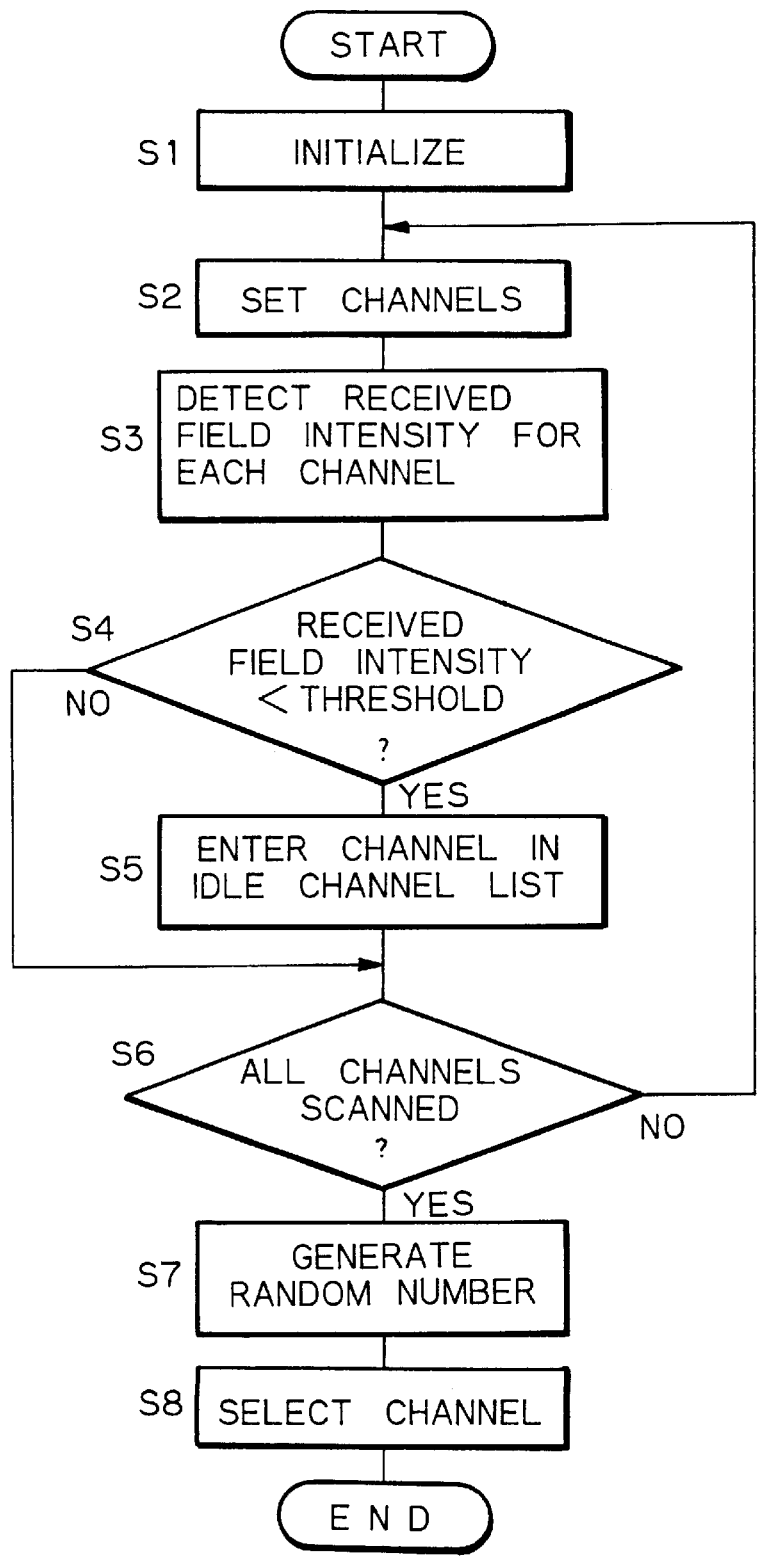
FIG. 2 is an exemplified flowchart useful for understanding the operation of selecting a channel in the embodiment shown in FIG. 1.

In operation, referring to FIG. 2, illustrating a control flow executed by the CPU 11 to select a suitable channel in the embodiment, the CPU 11 first initializes the system at step S1 to set all the parameters in the system to their initial values. Then, the CPU 11 sets among the channels listed in the assignable channel list 20 a first channel A, for example, whose frequency is fa MHz, through the channel transfer switch 19 at step S2.

In turn, the received field intensity detector 17 is set under the control of the CPU 11 to detect the field intensity of the electromagnetic waves received over the channel specified by the channel transfer switch 19 at step S3. The transmitter/receiver antenna 16 is able to receive the radiowaves of the frequency band available to the private wireless telecommunications systems from its environment. In the instant example, channel A is specified and the field intensity of the radiowave on channel A is measured by the detector 17. The signal representaive of the detected field intensity is converted into corresponding digital data by the A/D converter 18 to be in turn supplied to the CPU 11.

On the basis of the data representing the detected field intensity of channel A, the CPU 11 makes a decision at step S4 on whether or not the received field intensity is lower in level than the threshold value, that is, whether or not the channel in question is substantially idle. The threshold value is of course, obtained from the threshold data storage 14. If it is lower at step S4, i.e. if the channel is idle, then the CPU 11 proceeds to step S5 to form the idle channel list 21. More specifically, at step S5, the channel in question, thus determined substantially idle, is listed into the idle channel list 21. If the decision at step S4 is negative, i.e. the channel in question is determined busy, then the processing skips step S5 and proceeds to step S6.

At step S6, the CPU 11 makes a decision as to whether or not the search of the entire list assignable channels A-Z has been completed. In the present instance, the first channel A was selected to determine whether or not the channel was idle. In this example, the processing returns to step S2 and repeats the loop of steps S2 through S6 with a further channel, i.e. channel B, specified among the assignable channels defined by the channel table 20.

If the decision result at step S6 is positive, which means that all of the assignable channels A-Z have been scanned with respect to determining the field intensities of the radiowaves received on those channels the CPU 11 proceeds to step S7 to have the random number generator 22 generate a random number. By that time, all available or idle channels out of assignable channels A-Z have been listed on the idle channel table 21.

For example, assume that the field intensities of the assignable channels are determined as shown on Table 20 indicated below. It is to be noted that the specific values of the frequencies and received field intensities shown are mere examples, and hence, have not to be understood as restricting the invention.

TABLE 20

| Channels | Frequencies | Received field intensity |
| --- | --- | --- |
| ch 335 | 835.020 MHz | −40 dBm |
| ch 336 | 835.050 MHz | −60 dBm |
| ch 337 | 835.080 MHz | −95 dBm |
| ch 338 | 835.110 MHz | −105 dBm |
| ch 339 | 835.140 MHz | −100 dBm |
| ch 340 | 835.170 MHz | −115 dBm |
| ch 341 | 835.200 MHz | −85 dBm |
| ch 342 | 835.230 MHz | −70 dBm |
| ch 343 | 835.260 MHz | −80 dBm |
| ch 334 | 835.290 MHz | −100 dBm |

If the threshold value for deciding idle channels is set at −90 dBm, the idle channels are determined as shown on Table 21 indicated below, in this example.

TABLE 21

| Entry Number | Idle channels |
| --- | --- |
| 1 | ch 334 |
| 2 | ch 337 |
| 3 | ch 338 |
| 4 | ch 339 |
| 5 | ch 340 |

In response to the random number thus generated, the CPU 11 consults at step S8 with the idle channel table 21 and selects one of the idle channels included in the channel list 21 pursuant to the random number generated.

Considering that the number of entries in the list 21 is five in this case, the random number generator 22 generates a random number from one to five, or from zero to four, inclusive, for example, to be used by the CPU 11 for selecting one of the idle channels. For example, the CPU 11 selects the channel 338 (835.110 MHz) when the random number is three.

The transmission channel thus selected by the CPU 11 is set in the transmitter/receiver 15, which is in turn, communicable with the mobile terminal 30 on that transmission channel to transmit and receive speech and/or data to and from the terminal 30. Using the selected channel, the base station 10 thus carries out the radio communication with one of the mobile stations 30 through the transmitter/receiver 15.

In summary, in the illustrative embodiment, the threshold value to be compared with the field intensity of a received radiowave is set for determining idle ones of the assignable transmission channels, taking account of the receiver characteristics of the base station, the field intensities of the radiowaves received on the transmission channels is compared with the threshold value, and channels having the field intensity below the threshold value are determined as substantially idle channel, which will be listed in the idle channel list. Since a channel is selected at random from the channels included in the idle channel list, a probability that the base station competitively selects the same channel selected by a base station contiguous thereto can advantageously be reduced.

Although a random number generation is used for selecting an idle channel in the idle channel list, it is not essential but other means can be applied. For example, the system may be adapted to select an idle channel whose level is closer to the threshold value, or the idle channel whose received field intensity is minimum.

The entire disclosure of Japanese patent application No. 122732/1997 filed on May 14, 1997, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What I claim is:

1. A method of selecting a channel in a base station for communicating with a mobile terminal in a radio telecommunications system which shares transmission channels of a frequency band common to a radio telecommunications system adjacent thereto, comprising the steps of:

receiving radio waves on the transmission channels in the radio telecommunications system;

detecting a field intensity of the radio waves received;

comparing the detected field intensity with a predetermined threshold value to determine whether or not the detected field intensity of the transmission channels is less than the predetermined threshold value;

adding a transmission channel, for which the detected field intensity is determined to be less than the predetermined threshold value, into an idle channel list; and selecting one of the transmission channels included in the idle channel list for proceeding with establishing a connection to the mobile terminal, said step of selecting being carried out randomly among the transmission channels in the idle channel list.

2. The method according to claim 1, further comprising the step of setting the predetermined threshold value at a value corresponding to a field intensity which is received when said transmission channel is out of use, taking into account receiver characteristics of said base station.

3. The method in accordance with claim 1, further comprising the step of generating a random number, said step of selecting being carried out on the basis of the random number.

4. The method according to claim 1, wherein said step of selecting is carried out to select from the idle channel list a transmission channel whose level is closer to the threshold value.

5. The method according to claim 1, wherein said step of selecting is carried out to select from the idle channel list a transmission channel whose received field intensity is minimum.

6. Apparatus for selecting channel in a base station for communicating with a mobile terminal in a radio telecommunications system which shares transmission channels of a frequency band common to a radio telecommunications system adjacent thereto, comprising:

a receiver for receiving radio waves on the transmission channels in the radio telecommunications system;

a detecting circuit connected to said receiver for detecting a field intensity of the radio waves received;

control circuitry operative in response to said receiver and said detecting circuit for comparing the detected field intensity with a predetermined threshold value to determine whether or not the detected field intensity of the transmission channels is less than the predetermined threshold value;

means for adding a transmission channel, for which the detected field intensity is determined to be less than the predetermined threshold value, into an idle channel list; and means for selecting one of the transmission channels included in the idle channel list for proceeding with establishing a connection to the mobile terminal, said control circuitry comprising a random number generator for generating a random number and designating one of the transmission channels in the idle channel list on the basis of the random number.

7. The apparatus according to claim 6, wherein said predetermined threshold value is set at a value corresponding to a field intensity which is received when said transmission channel is out of use, taking into account receiver characteristics of said base station.

* * * * *